May 12, 1964  W. R. BUCHAN ETAL  3,132,510
ULTRASONIC INSPECTION APPARATUS
Filed Feb. 20, 1961  4 Sheets-Sheet 1
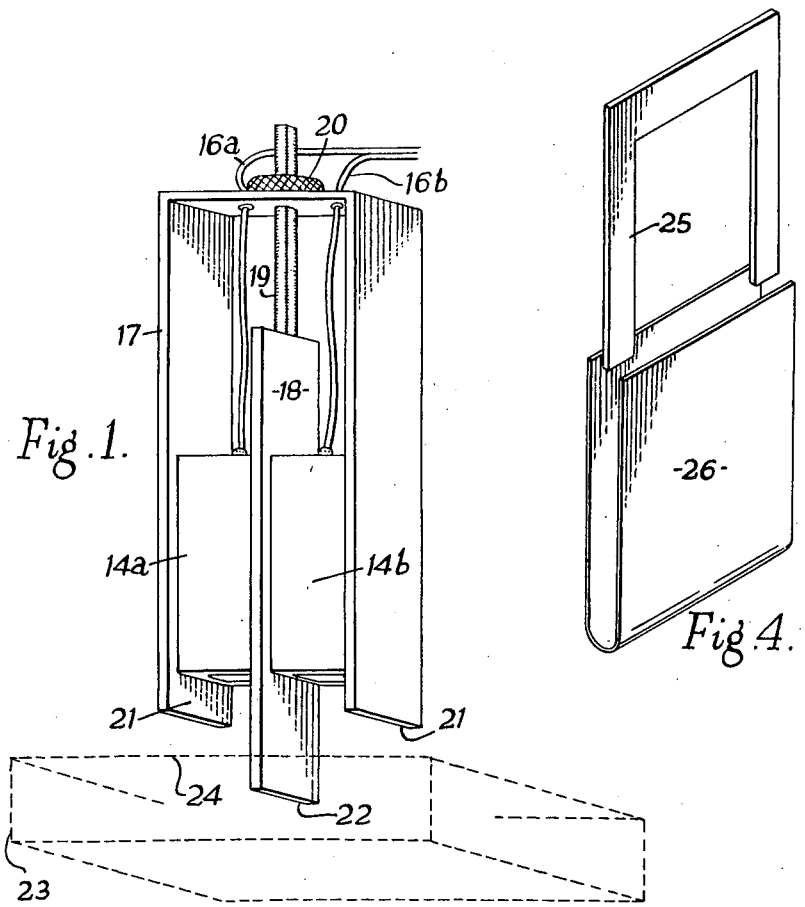
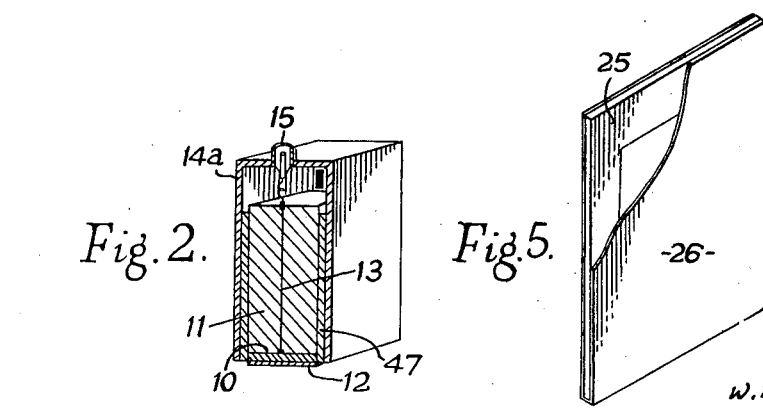
INVENTORS:
W. R. BUCHAN,
A. B. C. RANKIN,
BY S. W. C. BROWN
Snow & Hay
ATTORNEYS

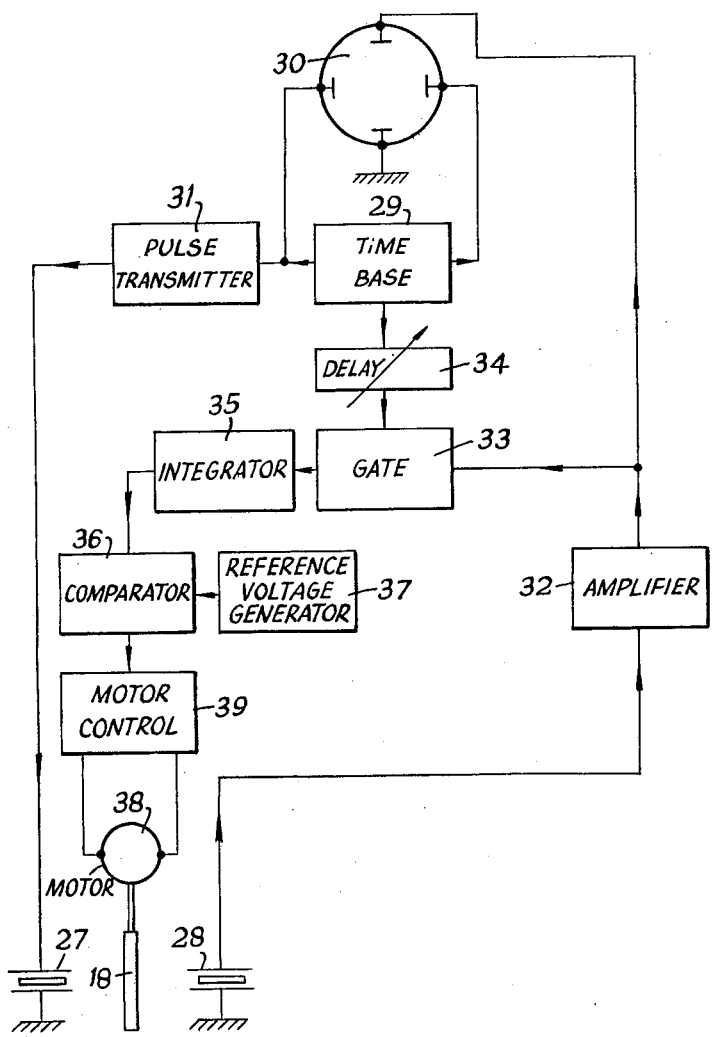

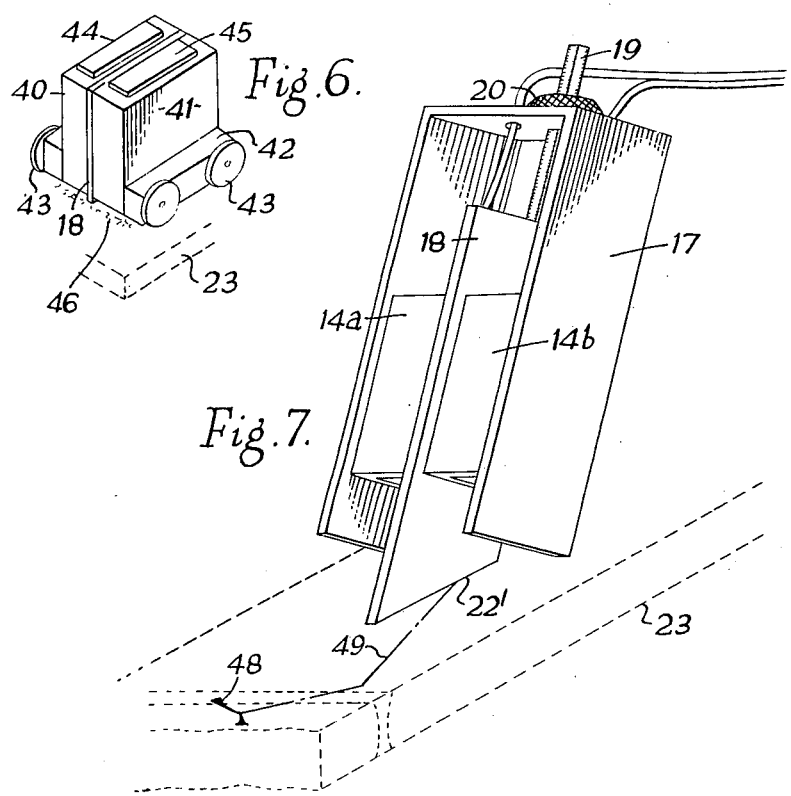
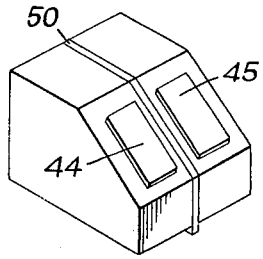
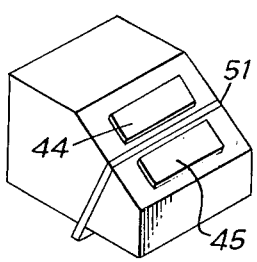
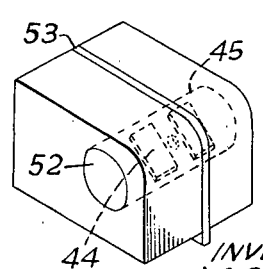

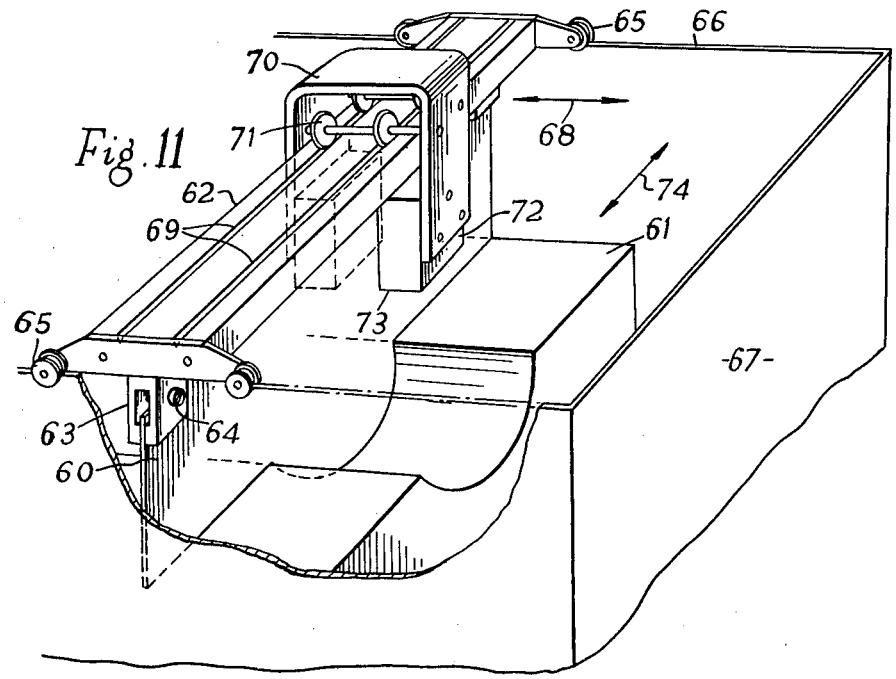
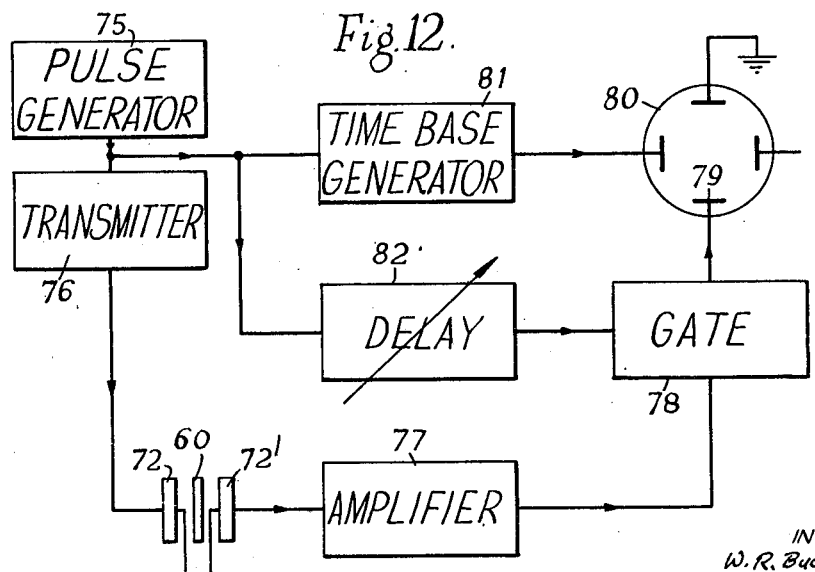

_United States Patent Office_

3,132,510
Patented May 12, 1964

3,132,510
ULTRASONIC INSPECTION APPARATUS
William Raymond Buchan, Alexander Bryce Calder Rankin, and Stanley William Charles Brown, all of Husan Works, New North Road, Barkingside, England
Filed Feb. 20, 1961, Ser. No. 90,416
Claims priority, application Great Britain Feb. 29, 1960
8 Claims. (Cl. 73—67.7)

This invention relates to ultrasonic inspection apparatus for use in non-destructive testing and measuring and is particularly concerned with improvements in probes for use with such apparatus. This application is a continuation-in-part of application Serial No. 801,344, filed March 23, 1959, now abandoned.

In one system used for the non-destructive testing and/or measurement of materials, the workpiece under inspection and the inspecting probe or probes are immersed in a liquid, ultrasonic energy being directed through the liquid into the workpiece and received back from the workpiece after reflection. Using such a method, it is found that a very large echo is received from the interface of the workpiece and the coupling liquid in which it is immersed. This echo is commonly referred to as the interface echo and in some circumstances it may be sufficiently large to obscure completely small echoes received from discontinuities, e.g., flaws, lying near the surface of the workpiece. In addition, the interface echo may be large enough to cause temporary paralysis of the receiver amplifier. On the other hand this echo is useful in indicating the position of one surface of the workpiece and is, therefore, of help in the determination of the depth of flaws.

It is an object of this invention to provide improved ultrasonic inspection apparatus well adapted for the detection of flaws lying close to the surface of a material under inspection.

It is a further object of the present invention to provide ultrasonic inspection apparatus whereby the amplitude of the interface echo may be controlled in a convenient manner.

According to this invention there is provided apparatus for use in the ultrasonic inspection of material which comprises transmitting means adapted to transmit ultrasonic pulses through a wave-transmitting surface thereof into the material, receiving means mounted alongside of the transmitting means and fixed in relation thereto and adapted to receive said ultrasonic pulses through a wave-receiving surface thereof after reflection, and an acoustic curtain disposed in the gap between the transmitting means and the receiving means and projecting beyond the said wave-transmitting and receiving surfaces. Preferably the curtain is made adjustable in such a manner that the distance between an edge of the curtain and the said surfaces can be adjusted.

The said surfaces are usually co-planar and parallel to the top surface of the specimen under inspection for flaws, in which case the said edge of the curtain may be parallel to the plane of the surfaces. Means, such as an adjusting screw, may be provided for adjusting the position of the curtain.

By an "acoustic curtain" is meant a body, usually in the form of a thin sheet of material, which reflects and/or absorbs a high percentage of incident acoustic energy. In other words, the curtain may consist of any material which will serve to insulate acoustically the transmitting means from the receiving means. Such curtains are well known in the art and are often made of cork or of some material having a closed cell structure such as those marketed under the trade names "Rubberzote" and "Onozote." Alternatively, a laminar construction may be adopted for the curtain whereby alternate laminae of two materials, differing widely in acoustic impedance, are bonded together so that by reflection at the successive interfaces between the laminae, very little of the incident acoustic radiation penetrates the curtain. For example, the two materials of the laminae may be metal or plastic and air, two outer laminae of metal foil can be spaced to enclose a lamina of air.

The arrangements referred to above are satisfactory where the contouring (that is the departure from rectilinearity) of the surface of the body being examined is in a direction parallel to the plane of the curtain and where the dimension of the body in this direction is not too great. The probe assembly including two transducers acting as wave-transmitting and receiving means, and the curtain between them can have a length (parallel to the plane of the curtain and to the wave-transmitting and receiving surfaces) comparable with the width of the body under test. The length of the body is usually much greater than its width and the test can be made by moving the probe assembly along the length of the body, that is in a direction perpendicular to the plane of the curtain.

If the width of the body (which is again assumed to be the direction of contouring) is comparable with or greater than the length of the body, it would be necessary to make the length of the probe assembly (as hereinbefore defined) large and this has disadvantages.

Thus the sensitivity of a given flaw detector to a given size of flaw is roughly proportional to the ratio of the area of the flaw to the area of the wave-transmitting and receiving surfaces of the transducers. For instance, if one is interested in flaws of the order of one square millimetre in area, the largest transducer dimensions that are found useful at present are of the order of a few centimetres.

Moreover although a curtain can control the interface echo over a very wide range (it may reduce the interface echo signal by as much as 120 db) there is always a residual interface echo signal. The amplitude of this residual signal is proportional to the length of the curtain exposed to the waves from the transmitting surface of the transducer and in the case of a long curtain the residual interface signal may be objectionably large.

A further object of the present invention is to provide apparatus with which the disadvantages set forth in the two preceding paragraphs can be substantially reduced. Thus where the acoustic curtain has a length (parallel to the plane of the curtain and to the wave-transmitting and receiving surfaces) which is substantially greater than the length of the said surfaces in the same direction, the transmitting and receiving means are made movable in the said direction relatively to the curtain.

The probe assembly including the curtain and the wave-transmitting and receiving means may be made movable at right angles to the said direction in order that the whole of a surface of a body under test may be explored.

The invention will be described, by way of example, with reference to the accompanying drawings in which:

FIGURE 1 is a perspective view of one embodiment of the invention,

FIGURE 2 is a view in section of one of the probes in FIGURE 1,

FIGURE 3 is a block circuit diagram of apparatus embodying the present invention, FIGURES 4 and 5 are perspective views of a preferred form of acoustic curtain, FIGURE 4 showing a step in the manufacture and FIGURE 5 showing the completed curtain with a part broken away, FIGURES 6, 7, 8, 9 and 10 show other embodiments of the invention in perspective, FIG. 11 is a perspective view, partly broken away, of another embodiment of the invention, and FIG. 12 is a block circuit diagram showing another apparatus embodying the invention.

In the following description, a structure consisting of a transmitting transducer means, a receiving transducer means and an acoustic curtain between the transmitting and receiving means will be referred to as a probe assembly.

Referring to FIGURES 1 and 2, the probe assembly shown is particularly adapted for use in immersion testing in which the workpiece is immersed in a water tank, each transducer assembly comprises a barium titanate plate 10 to the back of which is cemented a block 11 of material which exhibits a high absorption of ultrasonic waves and which also has a specific acoustic impedance identical to that of barium titanate. A suitable material for this purpose is a mixture of fine tungsten powder compacted with a binding agent such as that marketed under the registered trademark "Araldite." An absorptive backing material of this nature is used to prevent back reflection of the ultrasonic waves and the choice of an absorptive material having a specific acoustic impedance identical to that of barium titanate prevents the barium titanate plate "ringing" at its own resonance frequency. The front surface (that is the wave-transmitting or receiving surface hereinbefore referred to) of the barium titanate plate 10 is cemented to a quarter wavelength plate 12 of a material which has a specific acoustic impedance equal to the square root of the product of the specific acoustic impedance of barium titanate and of water. A suitable material for this purpose is composed of fine tungsten powder compacted with a binding agent, and a quarter wavelength plate of this nature forms an acoustic transmission line. The back surface of the barium titanate plate is connected to an electrical transmission line 13 in the conventional manner. Each transducer assembly is then mounted in a water-tight container 14a, 14b in such a manner that the front (outer) face of the quarter wavelength plate forms the whole or part of the base of the water-tight container. The assembly is sealed within the container by means of suitable cement indicated at 47. Each electrical transmission line is so arranged that it passes through a socket 15 in the top of the container for connection with the other components of an ultrasonic flaw detector in a conventional manner through a lead 16a or 16b as shown in FIGURE 1.

The two containers 14a and 14b are cemented or otherwise fixed to a common support member 17 with a gap between them. The curtain 18 is arranged to be slidable in the gap and is adjustable in the slide by means of a screw-threaded rod 19 and nut 20. The rod 19 is formed with flattened sides and passes through a rectangular aperture in the support member 17 so that rotation of the rod 19 is prevented. Preferably the length of the curtain is as shown in FIGURE 1, such that it passes through the whole length of the gap between the two transducer assemblies and can be made to extend some distance beyond the bottom of the containers 14a, 14b. The support member 17 may be provided with guide surfaces 21 parallel to and extending beyond the wave-transmitting and receiver surfaces of the transducers and adapted to engage the surface of the material being tested in order to maintain the transducer surfaces suitably spaced from the surface of the material.

When the assembly of FIGURE 1 is used in this way the curtain 18 would normally be retracted so that its lower surface 22 was co-planar with the surfaces 21.

In FIGURE 1 a test piece is indicated in phantom at 23, the upper front edge being at 24 and the probe assembly and test piece would be located in a suitable tank containing water.

For use in the inspection of materials, the probe assembly described may be substituted for the probes in a conventional ultrasonic flaw detector.

In use, the gap separating the lower edge 22 of the curtain from the material under inspection may be set by means of the screw adjustment 20. If this gap is set to the minimum consistent with the free movement of the probe assembly, virtually no echo signal will be received from the material/liquid interface. If the curtain is raised to give a larger gap, an appreciable interface echo signal will be received. The amplitude of this interface echo may thus be set to any desired value by adjusting the height of the curtain.

It has been found that when the height of the curtain is so set that only a very small interface echo signal is received, nevertheless strong echoes are received from discontinuities lying close to the surface of the material under inspection. At the same time, however, the probe assembly described is very sensitive to flaws lying a considerable distance away from the interface.

In a preferred and novel form of curtain which has been found to be particularly successful, sheets of metal or plastic foil are arranged to enclose an air gap between them and are supported by a forked member. A curtain of this kind may, for instance, as shown in FIGURES 4 and 5, comprise a forked member 25 consisting of two parallel arms projecting from the ends of a crosspiece. A sheet of metal or plastic foil 26 is folded double and the forked member is inserted between the two sheets so formed in such a manner that the fold lines across the open end of the fork. The foil is pressed into contact with the forked member as shown in FIGURE 5 and secured to the forked member by solder or adhesive cement.

In the embodiment described with reference to FIGURE 1, the curtain is moved manually in order to control the amplitude of the interface echo. Alternatively, however, the amplitude of the interface echo may be used to control the position of the curtain, or of the probe assembly as a whole relatively to a carriage or other support, by means of a servo mechanism. Thus, as shown in FIGURE 3 there are shown diagrammatically a transmitting probe assembly 27, a receiving probe assembly 28 and between these assemblies a curtain 18. These parts 27, 28 and 18 may be arranged and constructed as hereinbefore described. Time base signals from a generator 29 are fed to the X-plates of a cathode ray tube 30 and to a pulse transmitter 31 coupled to the probe assembly 27. Echo signals received by the probe assembly 28 are fed to an amplifiers 32 and thence to the Y-plates of the cathode ray tube. The output of the amplifier 32 is also applied to a gate circuit 33. Gating pulses are derived from the time base generator 29 and are delayed in a network 34 by such an amount that they serve to select only the interface signals. The interface echo signals from the gate 33 pass to an integrator 35 which derives therefrom a unidirectional voltage proportional to the interface echo amplitude. This voltage is fed to a comparator 36 where it is compared with a reference voltage from a reference voltage generator 37. When the two voltages are the same, there is no output from the comparator 36. It may be arranged that the output from the comparator controls through a control device 39 a reversible motor 38 which positions the curtain 18. In the condition in which there is no output from the comparator, it may be arranged that the motor 38 is switched off. In the cases where either the voltage derived from the interface echo or the reference voltage, is higher than the other, the motor is switched to run in the appropriate direction in order to bring both voltages to the same level again, after which the motor is once more switched off. If preferred the motor 38 may serve to move the probe assembly as a whole.

The embodiment just described is of particular use in the inspection of materials having irregular surfaces as it maintains a substantially constant spacing between the curtain and the adjacent surface of the material under test and hence enables the probe assembly to maintain its sensitivity to flaws lying near the top surface of the material.

Although we have so far described the invention in use with immersion testing apparatus, it is to be understood that the invention is not limited to such use and may be successfully employed in any contact and/or gap testing methods in which an interface signal is present. For example, there is shown diagrammatically in FIG. 6 an assembly suitable for use in contact testing. Two wave-transmitting probes 40 and 41 are mounted on a carriage 42 having wheels 43 which may rest upon the surface of material to be tested indicated in phantom at 23. On the upper surfaces of the probes are transducers 44—45. The curtain 18 extends beyond the lower faces of the probes and may be made adjustable in height. A coupling medium, such as oil, indicated at 46 is provided between the lower surfaces of the probes and the surface of the material 23. When the curtain 18 is made movable and is raised, the coupling liquid flows into the gap thus ensuring that there is no danger of an air gap being formed.

When the transducers are arranged in recesses in the probes the gap between the surface of the probe adjacent the surface of the material to be tested and the transducer may be filled with the coupling oil or the like or with the material of which the remainder of the probe is formed.

In cases where testing is to be carried out on complex sections of materials, it may be desirable to use shaped acoustic curtains. For instance, for testing cylindrical bodies the edge of the curtain may be given a part-circular concave shape adapted to mate with the cylindrical surface of the body.

Although the invention has been described as applied to apparatus employing longitudinal waves for ultrasonic inspection, it may readily be adapted for use in transverse and/or surface wave inspection methods.

FIGURE 7 shows an arrangement similar to that of FIGURE 1 for inspection by means of transverse waves, the lower surfaces of the probe assemblies 14a and 14b being suitably inclined relatively to the surface of the material 23 under test. The lower edge 22' of the curtain 18 is arranged to be approximately parallel to the surface of the material. The path of waves to and from a defect 48 in a weld is indicated approximately by the line 49.

FIGURES 8 to 10 illustrate diagrammatically other forms of probe assembly according to the invention suitable for use in inspection with transverse waves and employing liquid film or gap coupling with the test piece. In FIGURE 8 the curtain 50 is normal to the under surface of the assembly and the transducers 44 and 45 are arranged at the upper ends of probes.

In FIGURE 9 one transducer 44 is mounted above the other 45 on an inclined surface and the curtain 51 is inclined to the under surface of the assembly.

In FIGURE 10 there is shown an arrangement in which the transducers 44 and 45 are mounted upon a cylindrical support 52 which can be rotated about its axis in order to vary the angle of the surfaces of the transducers. The curtain is shown at 53.

The curtains 50, 51 and 53 may be made adjustable in height and in the case of FIGURE 10 this may be achieved by making the support 52 in two halves joined by a rod of small diameter, the rod passing through an aperture in the curtain of sufficient size to permit the required movement of the curtain.

The probes of FIGURES 6 and 8–10 are held together as a unit by a common support member such as element 17 of FIGURES 1 and 7.

Referring now to FIGURE 11, an acoustic curtain 60 constructed in one of the ways already described has its lower edge shaped to suit the contouring of a surface of a body 61 to be tested. The upper edge of the curtain is fixed to an elongated supporting block 62 the long dimension of which is parallel to the plane of the curtain. The curtain passes through slots in blocks 63 projecting downwards from the curtain at each end thereof and is clamped in position by means of screws 64. Only one of these clamping blocks is visible in FIGURE 11. The block 62 is provided at its ends with rollers 65 arranged to run upon rails 66 on two edges of a liquid-containing tank 67, the curtain thus depending from the block into the liquid in the tank and being movable on the rails in a direction 68 perpendicular to the plane of the curtain. Two parallel V grooves 69 are formed in the upper surface of the block parallel to the length of the block. A U-shaped transducer carrier 70 has two spindles rotatably mounted between its two limbs, each spindle carrying two wheels 71 engaging respectively in the two V grooves 69. The limbs of the U-shaped carrier extend downwards on either side of the block and curtain and a transducer 72 is fixed on the inside of each limb with its under surface 73 suitably above the lower edge of the curtain. One transducer acts as a transmitter and the other as a receiver.

In use, the body 61 to be tested is submerged in the liquid in the tank. The block 62 is placed with its rollers 65 on the rails 66 and the curtain 60 is arranged to have its lower edge in contact with or close to the upper surface of the body 61. The upper surface of the body is assumed to be contoured, as shown, in a direction parallel to the curtain but not in a direction at right angles to this. The transducers have a length (parallel to the V grooves 69) which is only a small fraction of the length of the curtain in this direction. With the block 62 in one position, the transducer carrier 70 is moved along the V grooves in the direction 74 and one strip of the body surface is thus tested. The block 62 is then moved on its rails 66 and the carrier 70 is moved along another strip of the body surface. Testing may proceed in this way until the whole surface of the body has been explored.

The apparatus of FIGURE 11 has substantial advantages for testing surfaces of bodies which have a substantial extent in two dimensions. It also has particular advantages where the surfaces are contoured in one direction only.

By suitably adjusting the height of the curtain 60 the amplitude of the interface echoes can be made very small relative to echoes from flaws immediately beneath the surface of the body 61.

Referring now to FIGURE 12, a pulse generator 75 generates recurrent pulses which modulate a transmitter 76. The transmitter generates pulses of ultrasonic waves which are fed to a transmitting transducer 72 which is arranged with a receiving transducer 72' and a curtain 60 as described with reference to FIG. 11. Echoes received by the transducer 72' are amplified at 77 and fed through a gate 78 to one deflecting plate 79 of a cathode ray tube 80. A time-base generator 81 triggered by pulses from the generator 75 serves to deflect the cathode ray beam in a time-base coordinate. The gate 78 is arranged to be normally closed and to be opened at desired instants in relation to the times of transmission of pulses by gating pulses derived from the generator 75 and delayed, as required, by a variable delay device 82.

The gate 78 may be arranged to isolate flaw echoes from boundary echoes and for instance to apply flaw echoes to operate an alarm device. By the use of the arrangement of FIGURE 12 the gate may be arranged to open very early without risk of false actuation of the alarm by the interface echoes. In fact the gate may open so early as to include the residual interface signal. It then serves to ensure that any signal that at the instant of transmission passes through the curtain from the transmitting to the receiving transducer does not appear on the screen of the cathode ray tube, where it might deflect the trace off the screen, or operate the alarm. As curtains cannot be made to act as a perfect screen, there is usually some transmission of energy through the screen.

By arranging that the gate is opened in time to pass the residual interface echo, all risk of the gate not passing a signal from a flaw close to the surface is avoided.

When material with a contoured surface is being examined, the interface echo will arrive at varying times as the transducers are moved along the V grooves. Nevertheless the gate can be arranged to open early enough to pass the earliest residual interface echo signal and there is therefore no risk, even in this case, of a flaw near the surface not being detected.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Apparatus for the ultrasonic inspection of material comprising transmitting means having transducer means for transmitting ultrasonic pulses through a wave-transmitting surface thereof, receiving means having transducer means mounted alongside of said transmitting means for receiving said ultrasonic pulses through a wave-receiving surface of said receiving means after reflection, an acoustic curtain disposed between said transmitting and receiving means and projecting beyond said surfaces, adjusting means for varying the position of said curtain in a direction having at least a component perpendicular to said surfaces, pulse generating means for generating said ultrasonic pulses, selecting means coupled to said transducer means of said receiving means and to said pulse generating means and selecting from signals received by said receiving means a signal occurring at a predetermined time after each said transmitted pulses, control voltage generating means coupled to said selecting means and generating from said selected signal a control voltage, and means coupling said control voltage generating means to said adjusting means, whereby said curtain is adjusted automatically in dependence upon the amplitude of said selected signal.

2. Apparatus according to claim 1 wherein said selected signal is the interface echo signal.

3. In a device for the non-destructive testing of materials by the use of ultrasonic waves and a coupling medium comprising in combination transmitting probe means comprising piezo-electric means, receiving probe means comprising piezo-electric means, acoustic curtain means contiguous to and separating said transmitting probe means and said receiving probe means, mounting means holding said curtain means and both said probe means together as a unit with said curtain means projecting closer to the material under test than the wave transmitting and receiving surfaces of said probe means by a distance which sets the amplitude of the interface echo received from the junction of said coupling medium and said material under test at a desired value and circuit means comprising signal generating means, amplifier means and indicating means connected to both said probe means whereby said interface echo does not obscure small echoes from flaws lying near the surface of the material under test in the indication presented by said indicating means, means to adjust the distance between said curtain and the material under test whereby the device is sensitive to flaws lying close to the surface of the material under test and also to flaws lying well below the surface of the material and removed from said junction; said means to adjust distance forming part of said circuit means and comprising a reversible motor and means connected to receive signals from said amplifier means and from said signal generating means and to deliver control signals to said reversible motor to adjust the position of said curtain means relative to said probe means and said material in response to the amplitude of said interface echo.

4. Apparatus for the ultrasonic inspection of material comprising transmitting means having transducer means adapted to transmit ultrasonic pulses through a wave-transmitting surface thereof into the material, receiving means having transducer means mounted alongside of the transmitting means and fixed in relation thereto for receiving said ultrasonic pulses through a wave-receiving surface thereof after reflection, an acoustic curtain disposed between said transmitting means and said receiving means and projecting beyond the said wave-transmitting and receiving surfaces, said acoustic curtain having a length (parallel to the plane of the curtain) which is substantially greater than the length of the said surfaces in the same direction and means supporting said transmitting and receiving means for movement in the said direction relatively to said curtain.

5. Apparatus according to claim 4 comprising means movably securing said curtain to said supporting means whereby the distance by which the curtain projects beyond said surfaces can be adjusted.

6. Apparatus according to claim 4, wherein said supporting means comprise a member elongated in the plane of said curtain, and a carriage member bearing said transmitting and receiving means and movable along said elongated member.

7. Apparatus according to claim 6 comprising further means supporting said elongated member for movement in directions perpendicular to the length of the elongated member.

8. Apparatus according to claim 7 comprising a tank having parallel opposite walls, said further supporting means extending along the upper edges of said opposite walls.

References Cited in the file of this patent

UNITED STATES PATENTS

| | | |
|---|---|---|
| 2,875,607 | Boxcer et al. | Mar. 3, 1959 |
| 2,946,904 | Renaut | July 26, 1960 |
| 2,989,864 | Bamford | June 27, 1961 |
| 2,995,925 | Worlton | Aug. 15, 1961 |

FOREIGN PATENTS

| | | |
|---|---|---|
| 771,362 | Great Britain | Apr. 3, 1957 |